United States Patent [19]

Ingram

[11] Patent Number: 4,608,394

[45] Date of Patent: Aug. 26, 1986

[54] ANTI-STATIC STYRENE POLYMER PARTICLES BY IMPREGNATION

[75] Inventor: Alvin R. Ingram, West Chester, Pa.

[73] Assignee: Atlantic Richfield Company, Los Angeles, Calif.

[21] Appl. No.: 818,311

[22] Filed: Jan. 13, 1986

Related U.S. Application Data

[62] Division of Ser. No. 791,479, Oct. 25, 1985.

[51] Int. Cl.$^4$ .............................................. C08J 9/22
[52] U.S. Cl. ...................................... 521/57; 521/56; 521/60; 521/85; 521/146
[58] Field of Search ....................... 427/222; 428/407; 521/56, 57, 60, 85

[56] References Cited

U.S. PATENT DOCUMENTS

| | | | |
|---|---|---|---|
| 2,989,782 | 6/1961 | Barkhuff, Jr. et al. | 521/85 |
| 3,236,681 | 2/1966 | Neiuphos et al. | 521/85 |
| 3,520,833 | 7/1970 | Wright | 521/85 |
| 3,553,112 | 1/1971 | Weinstein et al. | 521/85 |
| 3,826,765 | 7/1974 | Alteres, Jr. | 521/85 |
| 3,879,345 | 4/1975 | Furukawa et al. | 521/85 |

*Primary Examiner*—Morton Foelak
*Attorney, Agent, or Firm*—Lewis J. Young

[57] ABSTRACT

Expandable styrene polymer particles which have anti-static and anti-lumping properties during expansion are produced by adding 0.1 to 0.4 parts of alkyl and alkylaryl ethers of polyethoxyethanol mono- and diesters of phosphoric acid per 100 parts of polymer particles during impregnation of the polymer particles with blowing agents. The esters may be added as sole antistatic agent or in addition to the known internal additives which impart fast-cool and anti-lump properties.

5 Claims, No Drawings

ANTI-STATIC STYRENE POLYMER PARTICLES BY IMPREGNATION

This is a division of application Ser. No. 791,479, filed Oct. 25, 1985.

BAKGROUND OF THE INVENTION

This invention relates to a process for making expandable styrenic polymers anti-static and anti-lumping during pre-expansion by coating phosphoric acid esters of polyethoxyethanol ethers onto the expandable polymer particles during the impregnation of the polymers with blowing agents.

The making of low density, cellular, shaped, plastic articles from expandable particles of styrene polymers is well known. Such particles generally contain a blowing agent which boils below the softening point of the polymer and which will cause the particles to expand when they are heated. When the expanded particles are heated in a mold cavity, the particles expand further to full the mold and fuse together to form a shaped article.

The formation of molded articles from expandable styrene polymer particles is effected in two steps: (1) pre-expanding of foamable styrene polymer particles to a density of between 1 and 3 pounds per cubic foot; and (2) further heating the pre-expanded particles in a closed mold to cause further expansion and form a fused, one piece article having the shape of the mold. The second step is what is normally referred to as "molding".

The pre-expansion step may be carried out by heating the expandable polymer particles by any suitable heating medium such as steam, hot air, hot water, or radiant heat. A widely used method of pre-expansion of the particles is a process such as that disclosed in U.S. Pat. No. 3,023,715 by Rodman. Another method is that disclosed in U.S. Pat. No. 3,577,360 by Immel, which teaches the pre-expansion of polymer beads by heating in a dry atmosphere followed by the application of a vacuum to cause the particles to expand to the desired density.

An undesirable result of the pre-expansion before introduction into the mold is the tendency of the pre-expanded particles to clump together and form lumps which render the particles unsuitable for molding. These lumps cannot be properly conveyed in processing plants and are unsuitable for charging into molds of intricate contour due to improper fill-out of the molded articles. Even if reasonable fill-out is achieved, variations in density within the molded articles can result and voids also occur.

Various methods have been proposed for the preventing of lumping during pre-expansion, but these have all suffered from some objectionable feature such as rapid loss of blowing agent, poor flow of the treated beads, dust problems which cause plugging of the steam ports, and often serious reduction in fusion of the particles on molding. U.S. Pat. No. 3,520,833 teaches the addition of lecithin during the impregnation of the particles with the blowing agent. Unfortunately, the lecithin imparts an undesirable odor to the molded articles. U.S. Pat. No. 3,462,293 teaches to coat the particles with polymeric materials by a fluid bed process. This process involves an additional expense of fluidizing the particles and coating with the polymer latexes. U.S. Pat. No. 3,444,104 teaches the addition of calcium silico aluminate. This additive tends to foul transfer lines and molds with clay-like deposits.

Another problem encountered with styrenic polymer particles is that of static charge on the particles, both bfore and after pre-expansion. The static charges cause problems in conveying the particles smoothly into, for example, the pre-expander or during the molding operation. Various antistatic agents have been used to attempt to overcome the static problems.

SUMMARY OF THE INVENTION

It has now been found that phosphoric acid esters of polyethoxyethanol ethers, when coated onto the surface of expandable styrene polymer particles during impregnation serve as an anti-static and anti-lumping agent for the particles. Coating with from 0.10 to 0.40 parts of ester per 100 parts of polymer gives a foamable product which, when pre-expanded, exhibits less lumping than expandable styrene polymers not having the phosphate esters present. Moldings made from the coated particles have better static properties than those molded from unmodified styrene polymers.

DETAILED DESCRIPTION OF THE INVENTION

In accordance with this invention, a variety of expandable thermoplastic homopolymers and copolymers can be rendered anti-static and anti-lumping. The polymers may be derived from vinyl aromatic monomers including styrene, isopropylstyrene, alpha-methylstyrene, nuclear methylstyrenes, chlorostyrene, tert-butylstyrene, etc., as well as copolymers prepared by the copolymerization of a vinyl aromatic monomer with monomers such as butadiene, alkyl methacrylates, alkyl acrylates, acrylonitrile and maleic anhydride wherein the vinyl aromatic monomer is present in at least 50% by weight of the copolymer. For the purpose of convenience, these polymers and copolymers are referred to herein as styrene polymers.

Especially useful are polystyrene, and copolymers of styrene with 5-30 weight precent of acrylonitrile, maleic anhydride, or methyl acid maleate.

The styrene polymers may be in the form of beads, granules, or other particles convenient for the expansion and molding operations. Especially useful are the beads formed by the suspension polymerization of the vinyl aryl monomers alone or in combination with the minor amount of copolymerizable monomers.

The styrene polymers, can, of course, be produced by any of the known techniques. The preferred method of preparation is the suspension technique, which gives bead or pellet shaped product.

The styrene polymer particles may be made expandable by impregnating the styrene polymer particles with a suitable blowing agent.

To render the polymer particles expandable, the blowing agent is incorporated into the particles, as in U.S. Pat. No. 2,983,692 by suspending the particles in water in a ratio between 0.3 to 1 and 1.5 to 1 (polymer to water) with the aid of suspending agent systems such as tricalcium phosphate in combination with a surfactant to promote wetting.

During the impregnation of the particles with blowing agent, other additives can also be incorporated, such as internal fast-cool agents, pigments and dyes, stabilizers, anti-lump agents, self-extinguishing agents, plasticizers and the like.

The impregnation is conventionally carried out at temperatures ranging from about 80° to 150° C. Increasing the temperature makes the impregnation proceed at a faster rate.

The blowing agents are compounds which are gases or which will produce gases on heating. Preferred blowing agents include aliphatic hydrocarbons containing from 4–16 carbon atoms in the molecule, such as butanes, pentanes, hexanes, and the halogenated hydrocarbons which boil at a temperature below the softening point of the polymer. Mixtures of these agents may also be used, such as a mixture of 40–60% n-pentane and 60–40% trichlorofluoromethane. Usually from 3–20% of blowing agent per 100 parts of polymer is incorporated by the impregnation.

The esters suitable for the present invention are composed of mono- and diesters having the general formula

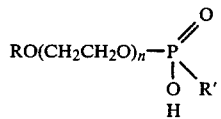

wherein R may be alkaryl groups such as octylphenyl, nonylphenyl, dinonylphenyl and dodecylphenyl, branched alkyl groups having at least 7 carbon atoms and normal alkyl groups having at least 10 carbon atoms; n may be a positive integer of from 1 to 33; and R' may be $RO(CH_2CH_2O)_n$-or hydroxyl group.

The esters may be prepared by reacting organic hydroxyl compounds with phosphorous pentoxide to form a uniform mixture of mono- and diesters of phosphoric acid. The organic hydroxyl compounds are non-ionic surfactants made by condensing a polyglycol ether with an organic alcohol or phenol. The continuous preparation of mixtures of mono- and diesters of phosphoric acid is described in U.S. Pat. No. 3,776,985, the disclosure of which is incorporated herein by reference. In general the antistats have the configuration of a condensation product of at least one mole of an alkylene oxide, preferably ethylene oxide, with one mole of a compound containing at least 5 carbon atoms and a reactive hydrogen atom; such as the alkylated and polyalkylated phenols, multi-branched chain primary aliphatic alcohols, and straight chain aliphatic alcohols having at least 10 carbon atoms.

The phenols and alcohols are preferably condensed with from 1 to 33 moles ethylene oxide. The condensation products are then esterified to the mon- and diesters of phosphoric acid. Commercial mixtures of said mono- and diesters are sold under the tradename "GAFAC" by GAF Corporation and "TRYFAC" by Emery Industries, Inc.

The esters are added to the polymer particles during impregnation of the polymer particles with blowing agents. Best results are obtained when amounts of ester antistats between 0.1 and 0.4 parts per 100 parts of polymer are added. Less than 0.1 part of antistat does not give sufficiently low static properties and greater than 0.4 part of antistat serves no useful purpose and increases the cost of the products.

For the present invention a impregnation is carried out using for the suspending agent system tricalcium phosphate, calcium carbonate, calcium hydroxide or mixtures of these. The agent forms the calcium salt of the phosphate esters, which are less soluble in the aqueous medium. This allows the esters to become attached to the surface of the polymer particles and remain affixed thereto even after subsequent acidification of the suspension to remove the calcium end of the molecule. In this method a ratio of calcium hydroxide to phosphate ester of 10 to 1 is optimum. Ratios as low as 3 to 1 may be used. Much lower or higher ratios result in less antilump or antistatic effect.

The invention is further illustrated by the following examples wherein parts are by weight unless otherwise indicated.

EXAMPLE I

To each of four 12 oz. bottles, there was charged in sequence 100 parts of water, 0.2 parts of sodium dodecylbenzenesulfonate, 1.0 parts of tricalcium phosphate, 100 parts of polystyrene beads having a particle size of predominantly through 25 and on 40 mesh, U.S. Standard Sieve, 8.1 parts of n-pentane, and 0.3 parts of the GAF Corporation GAFAC mono- and diphosphate indicated in Table I. The bottles were sealed and heated to 115° C. with end-over-end agitation for 2 hours. The suspension was cooled to room temperature and acidified to a pH of 1.0 with HCl. The beads were separated from the aqueous phase by centrifuge, washed with water, and air dried to room temperature. A control experiment was run using the above procedure omitting the phosphate esters.

The beads from the above impregnation process were pre-expanded to a density of about one pound per cubic foot (p.c.f.). A weighed portion of the pre-expanded particles was then screened through a 4 mesh screen and the percent lumping determined by weighing the residue of fused pieces on the screen. The pre-expanded beads were then molded into 8" diameter disks, 2" thick by placing the beads in a conventional mold. Steam at 30 psig was introduced into the steam chest to cause the granules to expand and fuse together. Results are shown in Table I.

TABLE I

| Additive (0.3%) | | Batch Expansion | | Foam Molding | |
|---|---|---|---|---|---|
| Name | Structure[1] (R in Hydrophole) | Foam Density, pcf. | Lumps, % | Back Pressure psig. | Fusion, % |
| GAFAC RD-510 | Branched Aliphatic | 1.05 | 0.0 | 15.4 | 30–35 |
| GAFAC RS-410 | Branched Aliphatic | 1.13 | 0.0 | 15.8 | 45–50 |
| GAFAC RE-610 | Nonylphenyl | 1.01 | 4.4 | 14.1 | 50–55 |
| None | — | 1.10 | >50.0 | Not Moldable | |

[1]Monoester $RO(CH_2CH_2O)_n$—P(=O)(OH)(OH)

Diester $(RO(CH_2CH_2O)_n)_2$—P(=O)(OH)

R = alkyl or alkylaryl radical
n = average number of ethylene oxide radicals reacted with one mole of hydrophobe These results show that the aliphatic and alkylaromatic ethers of glycol phosphates are effective per se as impregnated anti-lumping agents. These results were quite meaningful because of the high propensity of small (−25+40-mesh) expandable polystyrene beads to lump, i.e. to an extent of 50–90%, in an unstirred expander.

EXAMPLE II

To each of a series of 12 oz. Crown cap bottles was charged 100 g. of water, 100 g. of polystyrene beads having bead size of predominantly through 16 and on 35 mesh, U.S. Standard Sieve, and the suspending agent system shown in Column 1 of Table II along with 8.1 g n-pentane.

The bottles were capped, rotated end-over-end for 1.5 hours to bring the temperature to 115° C. and maintained for 3 hours at 115° C. in an oil bath. The bottles were then cooled to room temperature, opened, acidified with hydrochloric acid, the beads separated from the aqueous medium, washed with water and air dried.

The beads were pre-expanded by heating for 2 minutes in steam at 5 psig. A weighed portion of pre-puffed beads were then screened through a 4 mesh screen and the percent lumping determined by weighing the residue of fused pieces on the screen. The results are shown in Table II.

The antistatic properties of the phosphate esters was determined by molding the samples into 8 inch diameter disks of 2 inch thickness and then subjecting these to a Static Charge Analyzer, Model 276 from Princeton Electro Dynamics, Inc. The samples were charged with an ion current from a corona discharge. Sample disks were aged at the relative humidities (RH) shown and the peak sample voltage and current charge was recorded graphically for 40 seconds. Measurements given in Table II include the peak voltage and the discharge rate in volts per second over 40 seconds.

Other methods of incorporating such water-soluble antistats in slurries of expandable beads were ineffective for imparting antistatic properties to molded foams, for example:

1. Adding the antistat just prior to acidifying and washing the slurry of cooled impregnated beads;
2. Replacing calcium hydroxide in Run No. 5 of Table II by poly(vinyl alcohol) or hydroxyethyl cellulose as water-soluble suspending agents for the impregnation;
3. Replacing calcium hydroxide by zinc oxide, magnesium oxide or basic magnesium carbonate as inorganic suspending agents for the impregnation.
4. Omitting calcium hydroxide in Run No. 5 or replacing it with water-soluble calcium chloride.

We claim:

1. A composition comprising a styrene polymer containing dispersed throughout 3 to 20 weight percent of a blowing agent and coated on the surface thereof by 0.1 to 0.4 percent of a mixture of esters having general formula

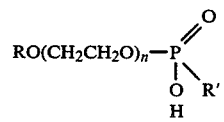

wherein R may be alkaryl groups, branched alkyl groups having at least 7 carbon atoms, or normal alkyl groups having at least 10 carbon atoms; n may be a

TABLE II

| Run No. | n-Pentane Impregnation Charge for 100 grams polymer Beads + 100 g Water | % Lumps[a] In Batch Expander | 1 PCF Foam Properties[b] | | | |
|---|---|---|---|---|---|---|
| | | | Fusion | | Static Test | |
| | | | Inner, % | Edges | Max V/Disc/RH%[c] | Max V/Disc/100% RH |
| 1 | 2% Tricalcium Phosphate (TCP) 0.02% Ultrawet K[d] | >30 | 18 | Tight | 1060/0.2/31 | 1030/0.3 |
| 2 | 3% TCP; 0.15% Brij 58;[e] 0.15% Triton X-165;[f] 0.03% Ultrawet K | 50 | 12 | Tight | 1040/0.3/28 | 1090/0.3 |
| 3 | 1% TCP 0.16% Triton X-165 0.3% Gafac RE-610 | 3 | 20 | Tight | 810/0.75/15 | 820/1.25 |
| 4 | 2% Ca(OH)$_2$; 0.15% Brij 58; 0.15% Triton X-165 | >10 | 11 | V Sl Loose | 1030/0.25/14.5 | 960/1.0 |
| 5 | 2% Ca(OH)$_2$; 0.2% Gafac RE-610 | 2 | 20 | Loose | 840/4.1/31 | 800/13.3 |
| 6 | 1% Ca(OH)$_2$; 0.1% Gafac RE-610 0.15% Brij 58; 0.15% Triton X-165 | <5 | 17 | Tight | 950/0.5/14.5 | 760/1.75 |

[a]Beads lumping less than 12% in the unstirred expander generally expand with little or no lumps in a continuous stirred tank expander.
[b]Two inches thick × 8 inches diameter.
[c]Max V = Maximum voltage charged in 10 seconds. Disc = Discharge rate in volts per second over 40 seconds.
[d]sodium dodecylbenzene sulfonate (Sold by ARCO Chemical Co.)
[e]polyoxyethylene (20) monocetyl ether (Sold by ICI Americas, Inc.)
[f]iso-octylphenoxy polyethoxy (16) ethanol (Sold by Rohm & Haas Co.)

It can be seen from Table II that the phosphate esters greatly reduce the percent lumping and improve the static properties.

To determine the degree of attachment of the antistat, an attempt was made to remove it from the beads of Run No. 5 by extensively washing them with water alone or water containing alkaline hydroxides (sodium, potassium or ammonium). In each case, the foams made from the washed beads exhibited antistatic properties similar to those of the beads before washing. It is apparent that the antistat is firmly attached to the bead surfaces.

positive integer of from 1 to 33; and R' may be RO(CH$_2$CH$_2$O)$_n$- or hydroxyl group.

2. The composition of claim 1 wherein the styrene polymer is polystyrene.

3. The composition of claim 1 wherein the styrene polymer is a copolymer of styrene with minor amounts of acrylonitrile.

4. The composition of claim 1 wherein the styrene polymer is a copolymer of styrene with minor amounts of maleic anhydride.

5. The composition of claim 1 wherein the styrene polymer is a copolymer of styrene with minor amounts of methyl acid maleate.

* * * * *